United States Patent
Yamazaki

(10) Patent No.: US 8,525,063 B2
(45) Date of Patent: Sep. 3, 2013

(54) WIRE ELECTRIC DISCHARGE MACHINING APPARATUS

(75) Inventor: Kiyoyuki Yamazaki, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 10 days.

(21) Appl. No.: 13/260,371

(22) PCT Filed: Jul. 1, 2010

(86) PCT No.: PCT/JP2010/061726
§ 371 (c)(1),
(2), (4) Date: Sep. 25, 2011

(87) PCT Pub. No.: WO2011/002108
PCT Pub. Date: Jan. 6, 2011

(65) Prior Publication Data
US 2012/0024821 A1 Feb. 2, 2012

(30) Foreign Application Priority Data
Jul. 1, 2009 (JP) ................................. 2009-156580

(51) Int. Cl.
*B23H 7/02* (2006.01)
*B23H 7/20* (2006.01)

(52) U.S. Cl.
USPC ...................... 219/69.12; 219/69.13; 700/162

(58) Field of Classification Search
USPC .......... 219/69.12, 69.13, 69.18, 69.17, 69.19; 700/162
See application file for complete search history.

(56) References Cited

U.S. PATENT DOCUMENTS

| 4,431,895 A | * | 2/1984 | Obara | 219/69.18 |
| 4,559,434 A | * | 12/1985 | Kinoshita | 219/69.17 |
| 5,756,956 A | | 5/1998 | Sato et al. | |

FOREIGN PATENT DOCUMENTS

| JP | S58-109230 | | 6/1983 |
| JP | 05-016025 | | 1/1993 |
| JP | 5-50333 A | * | 3/1993 |
| JP | 5-77109 A | * | 3/1993 |
| JP | H05-104330 | | 4/1993 |
| JP | H07-290319 | | 11/1995 |
| JP | H08-118154 | | 5/1996 |
| JP | 10-69-002 A | * | 3/1998 |

OTHER PUBLICATIONS

Machine translation of Japan Patent document No. 10-69,092, Nov. 2012.*

* cited by examiner

*Primary Examiner* — Geoffrey S Evans
(74) *Attorney, Agent, or Firm* — Jianq Chyun IP Office

(57) ABSTRACT

A wire electric discharge machining apparatus for machining a workpiece (7) by supplying current pulses to a work gap formed between a wire electrode (8) and the workpiece comprises a person detection sensor (10) for generating a person detection signal (EX) when the existence of a person is detected, and an NC device (20) that is configured to receive the person detection signal. When the NC device receives the person detection signal, it selects first machining conditions which improve machining speed. When the NC device does not receive the person detection signal, it selects second machining conditions which reduce the risk of wire breakage.

3 Claims, 4 Drawing Sheets

| Record number | C212 | C213 | C214 | C139 |
|---|---|---|---|---|
| ON | 4 | 5 | 6 | 2 |
| OFF | 12 | 13 | 14 | 2 |
| WP | 5 | 5 | 5 | 2 |
| | 1 | 1 | 1 | 3 |

| | Level | −3 | −2 | −1 | 0 | +1 | +2 | +3 |
|---|---|---|---|---|---|---|---|---|
| Material removal rate (low ↔ high) | ON | 40 | 60 | 80 | 100 | 120 | 140 | 160 |
| Energy (weak ↔ strong) | OFF | 160 | 140 | 120 | 100 | 90 | 80 | 70 |
| | WP | 100 | 100 | 100 | 100 | 100 | 100 | 120 |
| | | 130 | 120 | 110 | 100 | 100 | 100 | 100 |
| | | | | | | | | (%) |

WIRE ELECTRIC DISCHARGE MACHINING APPARATUS

CROSS-REFERENCE TO RELATED APPLICATION

This application is a 371 of international application of PCT application serial no. PCT/JP2010/061726, filed on Jul. 1, 2010, which claims the priority benefit of Japan application no. 2009-156580, filed on Jul. 1, 2009. The entirety of each of the above-mentioned patent applications is hereby incorporated by reference herein and made a part of this specification.

BACKGROUND OF THE INVENTION

1. Technique Field

The present invention relates to a wire electric discharge machining apparatus for machining a workpiece by causing electric discharge in a gap (hereafter referred to as "work gap") formed between a wire electrode and the workpiece. In particular, the present invention relates to a wire electric discharge machining apparatus in which machining conditions can be varied.

2. Background Technique

In general, a wire electric discharge machining apparatus has a wire electrode supported vertically between a pair of wire guides. During machining, the wire electrode is unwound from a bobbin, and travels along a transport path. Dielectric fluid is injected into the work gap during machining. Dielectric fluid may be water having a resistivity of $5 \times 10^4$-$1 \times 10^5$ Ω·cm. A wire electric discharge machining apparatus applies voltage pulses to the work gap in order to cause electric discharge. Dielectric fluid is ionized by the application of voltage, and electric discharge occurs in the work gap.

As a result, current flows through the work gap and an on-time commences. On-time is also called pulse duration. When on-time is completed, the wire electric discharge machining apparatus stops supply of current and an off-time is commenced. Off-time is also called pause time. When off-time is completed, the wire electric discharge machining apparatus again applies voltage to the work gap. Supply of current pulses to the work gap is then repeated, and workpiece material is removed.

Machining conditions are determined based on material and thickness of the workpiece, and diameter and material of the wire electrode. Machining conditions are also based on a target value for surface roughness. Machining conditions include, for example, on-time and off-time of current pulse, travel speed and tension of the wire electrode, and pressure of the dielectric fluid. Japanese Patent No. 2688128 discloses a wire electric discharge machining apparatus that varies machining conditions when workpiece thickness varies.

SUMMARY OF THE INVENTION

If on-time becomes large and off-time becomes small, the material removal rate rises. However, if this happens, the wire electrode becomes more susceptible to breakage between the pair of wire guides. When the wire electrode is broken, in almost all cases the wire electric discharge machining apparatus can automatically thread a wire electrode between the pair of wire guides. Depending on the situation the operator may need to restore the breakage of wire electrode (hereafter referred to as "wire breakage") manually. However, during unmanned operation restoring the wire breakage manually is impossible.

An object of the present invention is to provide a wire electric discharge machining apparatus that automatically selects machining conditions to reduce the risk of wire breakage during unmanned operation. An object of the present invention is also to provide a wire electric discharge machining apparatus that improves material removal rate.

A wire electric discharge machining apparatus of the present invention for machining a workpiece (7) by supplying current pulses to a work gap formed between a wire electrode (8) and the workpiece comprises a person detection sensor (10) for generating a person detection signal (EX) when the existence of a person is detected, and an NC device (20) that is configured to receive the person detection signal, for determining machining conditions depending on the person detection signal.

The NC device may select first machining conditions when the person detection signal is received, and select second machining conditions when the person detection signal is not received. The first machining conditions may include a first on-time, and the second machining conditions may include a second on-time that is shorter than the first on-time. The first conditions may include a first off-time, and the second machining conditions may include a second off-time that is longer than the first off-time.

According to the present invention, energy supplied to the work gap is weakened when there is no operator in the vicinity of the wire electric discharge machining apparatus. As a result, the risk of wire breakage is lowered. Further, energy supplied to the work gap is strengthened when there is an operator in the vicinity of the wire electric discharge machining apparatus. As a result, material removal rate is improved.

DESCRIPTION OF PREFERRED EMBODIMENTS

Figure 1:
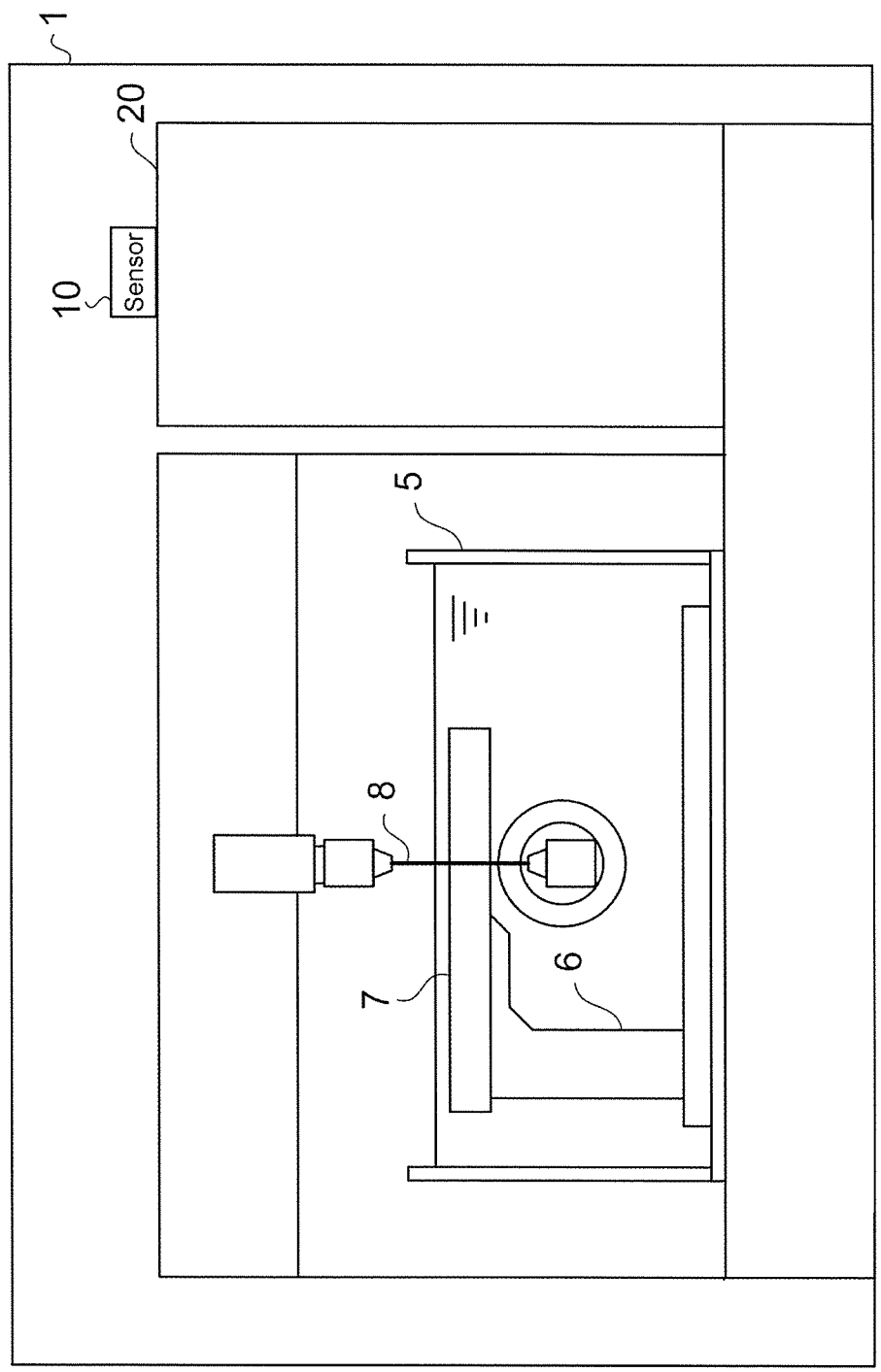
FIG. 1 is a front elevation showing a wire electric discharge machining apparatus of the present invention.

The wire electric discharge machining apparatus of the present invention will be described with reference to the drawings. As shown in FIG. 1, a wire electric discharge machining apparatus including an NC device 20 is covered by a cover 1. The wire electric discharge machining apparatus has a work tank 5, a table 6, and a wire electrode 8. The work tank 5 is filled with dielectric fluid. The table 6 is contained inside the work tank 5. A workpiece 7 is fixed to the table 6. A wire electrode 8 is supported vertically by a pair of wire guides. The wire electric discharge machining apparatus is provided with a power supply unit (not illustrated) for causing electric discharge by applying voltage between the wire electrode 8 and the workpiece 7.

The wire electric discharge machining apparatus further includes a person detection sensor 10. The person detection sensor 10 in FIG. 1 is attached to an upper surface of the NC device 20, but the location of the person detection sensor 10 is not limited. The person detection sensor 10 is configured to supply an output signal to the NC device 20. The person detection sensor 10 is formed from a pyroelectric infrared sensor or an ultrasonic sensor. A pyroelectric infrared sensor detects infrared rays corresponding to body temperature of a person, inside the cover 1. An ultrasonic sensor transmits ultrasonic waves and receives reflected waves, inside the cover 1. A person detection signal is generated based on variations in time between transmitting a wave and receiving a wave. The person detection sensor 10 may also include both a pyroelectric infrared sensor and an ultrasonic sensor. In this case, when both the pyroelectric infrared sensor and the ultrasonic sensor detect the existence of a person, the person detection sensor 10 may generate a person detection signal.

Figure 2:
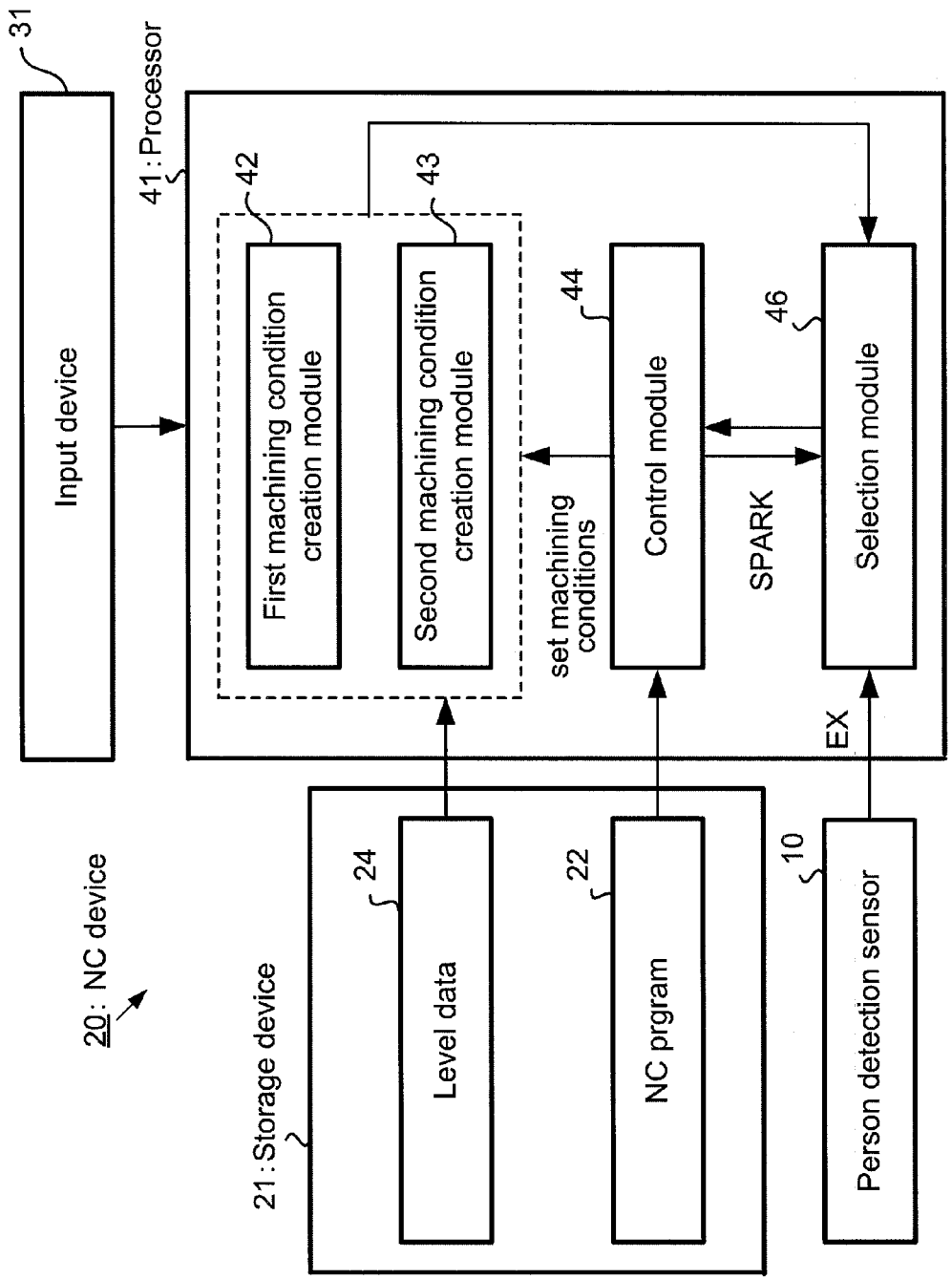
FIG. 2 is a block diagram showing an NC device in FIG. 1.

As shown in FIG. 2, the NC device 20 includes a storage device 21, an input device 31, and a processor 41. The NC device 20 is configured to receive a person detection signal EX. The storage device 21 is formed from a hard disk, and stores an NC program 22 and level data 24. The NC program is a program for electric discharge machining of the workpiece 7. The NC program 22 includes commands for moving the wire electrode 8, and commands for supplying dielectric fluid to the work tank 5.

Figures 3, 4, 5:
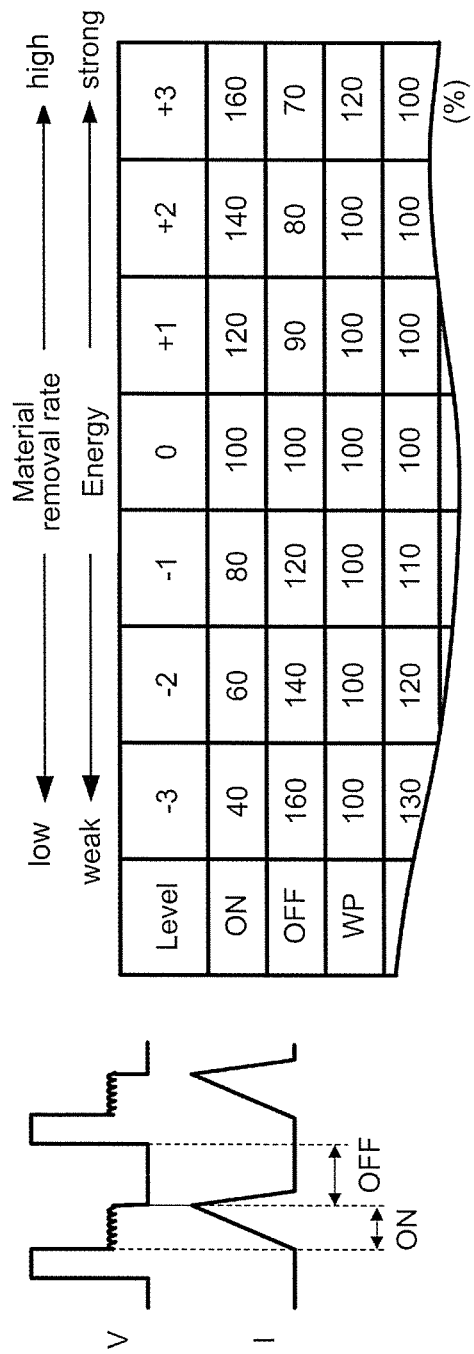
FIG. 3 is a table showing one example of machining conditions.
FIG. 4 is a drawing showing the waveform for voltage (V) and current pulses (I) applied to the work gap.
FIG. 5 is a table showing one example of level data in FIG. 2.

The NC program 22 further includes a plurality of groups of set machining conditions. One example of the machining conditions is partially shown in FIG. 3. In order to simplify description, only four groups of machining conditions are shown. A number is assigned to each group of machining conditions. Each group of machining conditions includes at least "ON", "OFF" and "WP". As shown in FIG. 4, "ON" represents on-time of the current pulses, and "OFF" represents off-time of the current pulses. "WP" represents the pressure of the dielectric fluid.

One example of the level data 24 is partially shown in FIG. 5. The level data 24 includes several levels. Each level includes a plurality of coefficients for increasing or decreasing machining conditions. In order to simplify description, only seven levels are shown. When level "0" is selected, machining conditions are not changed.

If a level larger than "0" is selected, energy supplied to the work gap is increased. As a result, there is a high risk of wire breakage but material removal rate is increased. If a level of "+3" is selected, "ON" is increased to 160%, "OFF" is decreased to 70%, and "WP" is increased to 120%. If a level smaller than is selected, energy supplied to the work gap is reduced. As a result, material removal rate is reduced but the risk of wire breakage becomes low. If a level of "−3" is selected, "ON" is decreased to 40%, and "OFF" is increased to 160%.

The input device 31 is constituted by, for example, a keyboard or a mouse. The operator can instruct execution of an NC program using the input device 31. It is also possible for the operator to select two "levels" from the level data 24 using the input device 31. The two "levels" include a first level and a second level.

The first level is used in order to improve material removal rate when a person exists within the cover 1. The first level is normally selected from among "+1", "+2", and "+3" in FIG. 5. The second level is used in order to lower the risk of wire breakage when a person is not within the cover 1. The second level is normally selected from among "−3", "−2", and "−1" in FIG. 5.

The processor 41 is formed from a CPU and a memory. The person detection sensor 10 supplies a signal EX to the processor 41 when it detects the existence of a person within the cover 1. The processor 41 includes a first machining condition creation module 42, second machining condition creation module 43, control module 44, and selection module 46. The first machining condition creation module 42 creates first machining conditions by multiplying set machining conditions by coefficients included in the first level. The second machining condition creation module creates second machining conditions by multiplying set machining conditions by coefficients included in the second level.

The control module 44 decodes the NC program 22 and supplies control signals to each section of the wire electric discharge machining apparatus. The control signals are supplied to a power supply unit, a dielectric fluid supply unit, and drive motors. The control module 44 supplies a signal SPARK, representing that the power supply unit is causing electric discharge to occur in the work gap, to the selection module 46. The control module 44 supplies set machining conditions to the first and second machining condition creation modules 42 and 43. The selection module 46 selects first machining conditions or second machining conditions based on the signals SPARK and EX.

Figure 6:
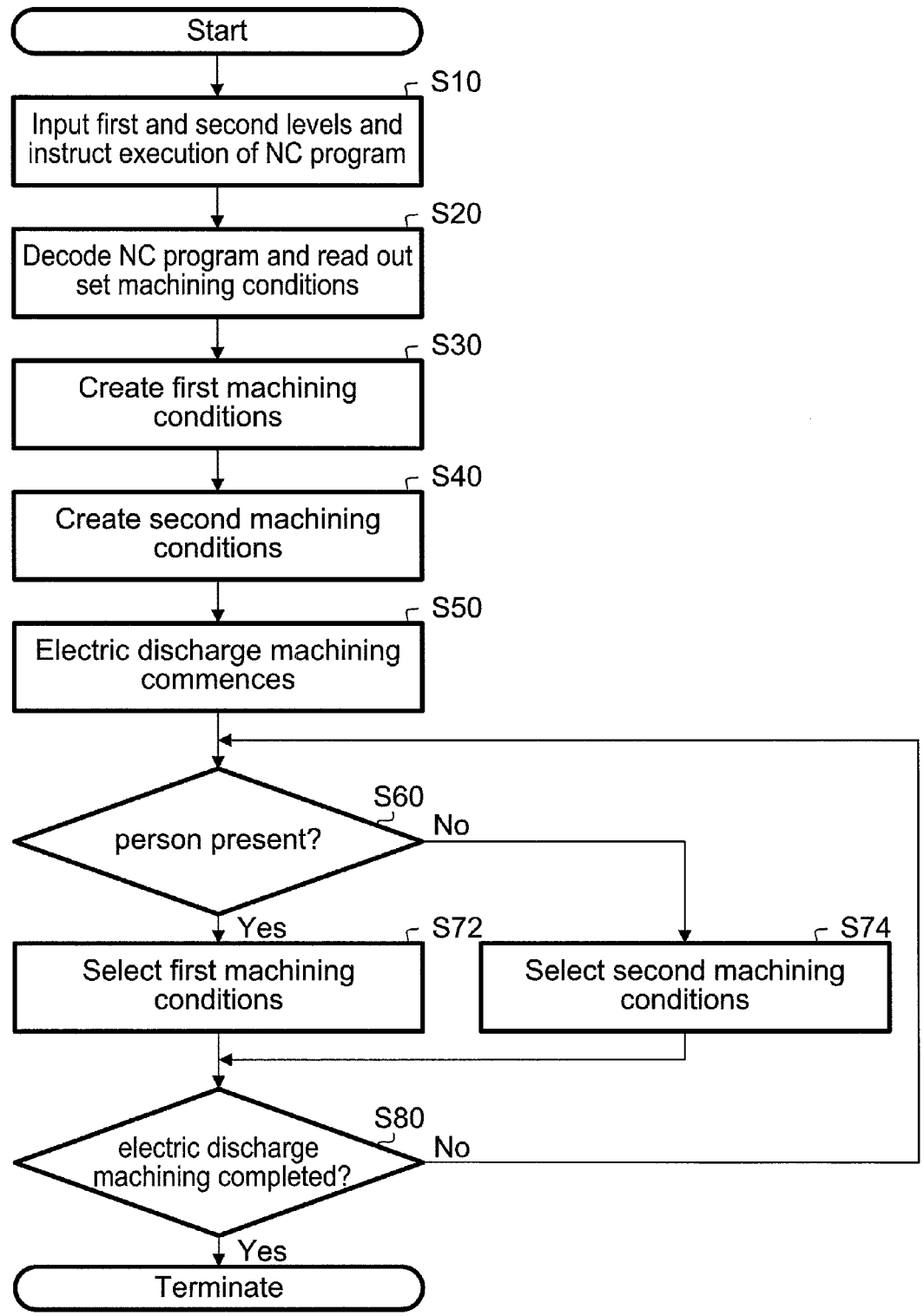
FIG. 6 is a flowchart showing operation of the NC device in FIG. 1.

Next, a process for the NC device 20 changing machining conditions will be described with reference to the flowchart of FIG. 6. In step S10, the operator inputs first and second levels using the input device 31. The operator also instructs execution of the NC program 22 using the input device 31. In step S20 the control module 44 decodes the NC program 22 and reads out set machining conditions. The control module 44 supplies control signals to each section of the wire electric discharge machining apparatus in accordance with the set machining conditions. A program for electric discharge machining is executed. The set machining conditions are supplied to the first and second machining condition creation modules 42 and 43.

In step S30, the first machining condition creation module 42 creates first machining conditions by changing the set machining conditions in accordance with the first level. In step S40, the second machining condition creation module 43 creates second machining conditions by changing the set machining conditions in accordance with the second level.

In step S50, the power supply unit supplies electrical power to the work gap and electric discharge machining commences. In step S60, when the existence of a person within the cover 1 is detected by the person detection sensor 10, the process advances to step S72. Otherwise, the process advances to step S74. In the step S72, the selection module 46 requests the control module 44 to change the set machining conditions to the first machining conditions. In the step S74, the selection module 46 requests the control module 44 to change the set machining conditions to the second machining conditions.

After the step S72 or step S74 the process advances to step S80. If electric discharge machining has been completed in the step S80, the process is terminated. Otherwise, the process loops back to the step S60. Therefore, when a person is present around the wire electric discharge machining apparatus, increased energy is supplied to the work gap. When a person is not present, reduced energy is supplied to the work gap, and the risk of wire breakage is lowered.

The invention claimed is:

1. A wire electric discharge machining apparatus for machining a workpiece by supplying current pulses having on-time and off-time to a work gap formed between a wire electrode and the workpiece, comprising a person detection sensor for generating a person detection signal when the presence of a person is detected, and an NC device that is configured to receive the person detection signal, for determining machining conditions depending on the person detection signal, wherein the NC device is configured for selecting first machining conditions when the person detection signal is received, and is configured for selecting second machining conditions when the person detection signal is not received, wherein the workpiece is still machined in the second machining conditions, but a material removal rate at the second machining conditions is less than a material removal rate at the first machining conditions.

2. The wire electric discharge machining apparatus according to claim 1, wherein the first machining conditions include a first on-time, and the second machining conditions include a second on-time that is shorter than the first on-time.

3. The wire electric discharge machining apparatus according to claim 1, wherein the first machining conditions include a first off-time, and the second machining conditions include a second off-time that is longer than the first off-time.

* * * * *